United States Patent
Garrigues et al.

(10) Patent No.: US 6,467,753 B1
(45) Date of Patent: Oct. 22, 2002

(54) SEALING JOINT AND CASING, ESPECIALLY FOR A STOPCOCK ACTUATOR

(75) Inventors: Jean-Claude Garrigues, Cadaujac; Hubert Ferragne, Bordeaux, both of (FR)

(73) Assignee: KSB S.A., Gennevilliers (FR)

(*) Notice: Subject to any disclaimer, the term of this patent is extended or adjusted under 35 U.S.C. 154(b) by 0 days.

(21) Appl. No.: 08/995,374

(22) Filed: Dec. 22, 1997

(30) Foreign Application Priority Data

Nov. 20, 1997 (FR) ............................. 96 15869

(51) Int. Cl.$^7$ .................. F16K 41/00; F16K 11/10; F15B 13/042
(52) U.S. Cl. .................. 251/214; 91/443; 137/596; 137/601.18; 137/601.2
(58) Field of Search ............... 137/269, 271, 137/884, 596, 596.14, 596.18; 251/214, 215, 367; 285/328; 277/590

(56) References Cited

U.S. PATENT DOCUMENTS

| | | | | |
|---|---|---|---|---|
| 2,558,687 A | * | 6/1951 | Krueger | 137/601.19 |
| 3,025,838 A | * | 3/1962 | Klancnik | 91/443 |
| 3,202,060 A | * | 8/1965 | Grotness | 91/443 |
| 4,082,108 A | * | 4/1978 | Dininio | 91/443 |
| 4,197,874 A | * | 4/1980 | Neff | 91/443 |
| 4,241,761 A | * | 12/1980 | Miller | 137/884 |
| 4,253,379 A | * | 3/1981 | Olson | 91/443 |
| 4,377,183 A | * | 3/1983 | Johansson et al. | 91/443 |
| 4,381,797 A | * | 5/1983 | Neff | 91/443 |
| 4,640,309 A | * | 2/1987 | Hoffmane et al. | 91/443 |
| 4,770,210 A | | 9/1988 | Neff et al. | 137/884 |
| 5,400,821 A | * | 3/1995 | Ott | 137/884 |
| 5,462,087 A | * | 10/1995 | Fukano et al. | 137/884 |
| 5,529,088 A | * | 6/1996 | Asou | 137/884 |
| 5,597,015 A | * | 1/1997 | Asou et al. | 137/884 |
| 5,680,883 A | * | 10/1997 | Gluf, Jr. | 137/884 |
| 5,704,399 A | * | 1/1998 | Hayashi et al. | 137/884 |
| 5,722,456 A | * | 3/1998 | Schumacher et al. | 137/884 |
| 5,749,395 A | * | 5/1998 | Hayashi et al. | 137/884 |
| 5,778,930 A | * | 7/1998 | Friedrichsen et al. | 137/884 |
| 5,845,672 A | * | 12/1998 | Reuter et al. | 137/884 |

FOREIGN PATENT DOCUMENTS

| | | | | |
|---|---|---|---|---|
| AT | 386 878 | | 10/1988 | |
| DE | 2334413 | * | 1/1975 | 91/443 |
| GB | 970776 | | 9/1964 | |

* cited by examiner

Primary Examiner—George L. Walton
(74) Attorney, Agent, or Firm—Knobbe, Martens, Olson & Bear, LLP

(57) ABSTRACT

Stopcock actuator casing, comprising a base (1) having an underside and formed with a hole (2), the underside of the base being subdivided into at least three compartments (4,8,10), the first (4) of which surrounds the hole (2) and the second (8) and third (10) of which are each formed with two orifices (12,13,14,15) passing through the base (1).

16 Claims, 2 Drawing Sheets

Fig :1
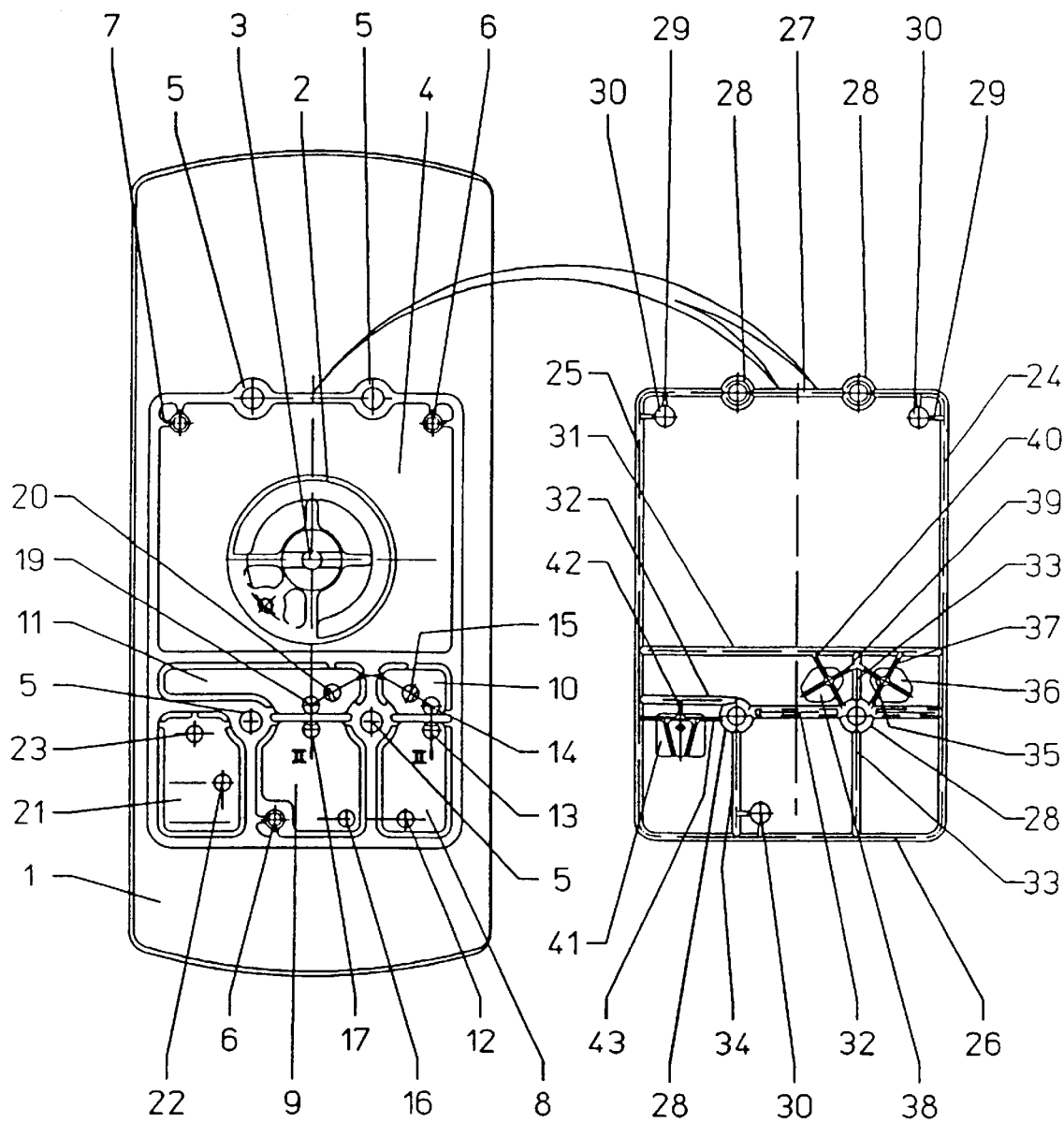
A          B

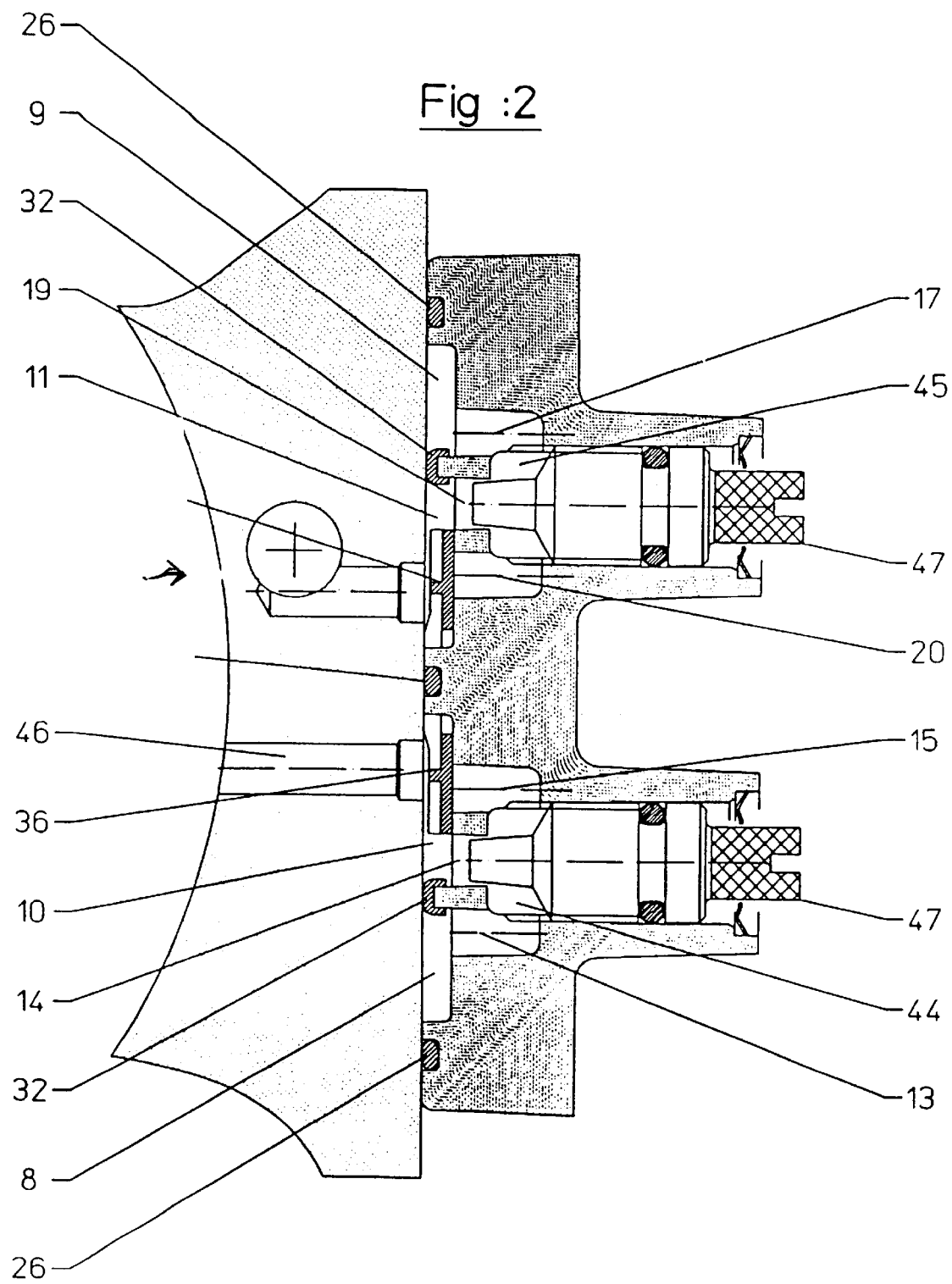
Fig: 2

US 6,467,753 B1

SEALING JOINT AND CASING, ESPECIALLY FOR A STOPCOCK ACTUATOR

FIELD OF THE INVENTION

This invention relates to an actuator. Specifically, the present invention relates to a sealing joint and casing for a stopcock actuator.

BACKGROUND

A stopcock actuator comprising a system for distributing drive fluid to the actuating cylinder of a seal is already known. The distribution system and the actuating cylinder are housed in separate envelopes which have to be connected by means of tubes or conduits.

This arrangement is bulky and makes assembly complicated.

SUMMARY OF THE INVENTION

The invention overcomes these drawbacks with a sealing joint and a stopcock actuator casing, in which the base of the casing is shaped so as to provide the connections for the distribution of fluid to the cylinder.

The base of the casing is, in particular, formed with a through-hole for a device for monitoring the position of the seal and the underside of the base is subdivided into at least three compartments, the first of which surrounds the hole whilst the second and third are each formed with two orifices passing through the base. The base may also be subdivided into at least five compartments each of which, with the exception of the first, has two orifices passing through the base, one of the orifices in the fourth compartment communicating on the upper surface of the base with one of the orifices in the second compartment, and one of the orifices in the fifth compartment communicating on the upper surface of the base with one of the orifices in the third compartment. These orifices provide a means of communication between the distribution system for the drive fluid and the cylinder, with the possibility of inserting a flow regulating device, e.g. in the form of a screw-type needle valve, in the orifice in the fourth compartment and the one in the fifth compartment communicating with one of the orifices in the second compartment and the third compartment.

Preferably, a sixth compartment is provided with a through-orifice and an orifice opening into a conduit provided in the base and opening outside the casing. This allows the drive fluid to escape from the actuating cylinder and also enables any fluid which has leaked into the inside of the casing to escape from there.

The invention also relates to a one-piece elastomer sealing joint shaped so as to define a mesh, at least in part, characterised in that it comprises, projecting into the mesh, a solid part attached to a first side of the mesh by means which enable the solid part to stand out from the plane of the mesh. Preferably, a flexible bar is provided linking the solid part to the first side of the mesh and another flexible bar is provided linking the solid part to the two sides of the mesh adjacent to the first side, the two bars being notably perpendicular. The solid part is able to move up out of the plane of the mesh under the effect of pressure or be returned thereto. Preferably, the solid part does not extend as far as the side opposite the first side. In any case, it is not attached thereto. Advantageously, it takes up one-third to two-thirds of the surface of the mesh. The joint may be in the form of a net and may define a plurality of meshes, at least two of which have a solid part. This sealing joint makes it possible to seal the pneumatic connections between the body of the cylinder and the casing of the actuator in a way which is very simple to produce and assemble.

In the accompanying drawings, which are provided solely by way of example:

FIG. 1A is a plan view of a stopcock actuator casing, with the joint shown in an exploded view (FIG. 1B), and FIG. 2 is a section on the line II—II in FIG. 1A.

DETAILED DESCRIPTION

The stopcock actuator casing shown in FIG. 1A comprises a base 1 formed with a hole 2 in which there is a control spindle 3 adapted to be acted upon by a mandrel (not shown) by means of which the position of the seal can be controlled. The hole 2 is provided in a first compartment 4. This first compartment 4 is substantially rectangular in shape. On one of the sides are provided two fixing holes 5 intended for a screw to pass through, whilst substantially at the top of the compartment but slightly towards the inside are provided two blind bores 6 which communicate via grooves 7 with the edges of the compartment, also in the form of a groove.

The base also has a second compartment 8, a third compartment 9, a fourth compartment 10 and a fifth compartment 11. All these compartments are substantially in the form of a rectangle the perimeter of which consists of a groove. The surface of the casing comprises, in the second compartment 8, a through-orifice 12 and an orifice 13 which communicates with an orifice 14 provided in the compartment 10. The orifice 14 in turn communicates with an orifice 15 provided in the compartment 10. Similarly, the compartment 9 has a through-orifice 16 and an opening 17 communicating with an orifice 19 in the compartment 11. The orifice 19 communicates with an orifice 20 in the compartment 11.

A sixth compartment 21 is provided, the perimeter of which consists of a groove. This compartment has two orifices 22 and 23. The orifice 22 communicates with the outside of the casing, whilst the orifice 23 passes through and communicates with the inside of the casing.

Between the compartments 8, 9, 10, 11, on the one hand, and 9, 11 and 21, on the other hand, there are again provided two screw holes 5, whilst between the compartments 9 and 21, again, a blind fixing bore 6 is provided.

The sealing joint (FIG. 1B), which fits in the grooves forming the sides of the compartments, is in the form of a net defining a plurality of meshes corresponding to the compartments. The substantially rectangular joint has two long sides 24, 25 and two short sides 26, 27. The side 27 has two circular parts 28 delimiting a hole for the passage of screws. At the apices, bounded by the sides 24 and 27 and 25 and 27, two lugs 29 each lead to a stud 30 adapted to project into the blind bores 6. The joint also has two bars 31, 32 parallel to the side 26 and going from the side 24 to the side 25 and two bars 33, 34 parallel to the side 24, the bar 33 going from the side 26 to the bar 31, whilst the bar 34 goes from the side 26 to the bar 32. The intersections of the bars 33 and 34 with the bar 32 comprise circular portions 28 for screw fixing. At the intersection of the bar 34 with the side 26 a stud 30 is also provided. Running diagonally from the bar 33 in the part corresponding to the compartment 10 is a bar 35 having a solid part 36. This solid part is not connected to the other sides of the part of the joint corresponding to the compartment 10, with the result that it can be raised or pressed down under the effect of pressure. Another bar 37 perpendicular to the bar 35 connects the bar 31 to the circular part 28, but could equally connect the bar 31 to the bar 33. In the same way, a solid part 38 is connected by the bars 39, 40 to the side of the joint corresponding to the compartment 11. A solid part 41 is also provided in the part corresponding to the compartment 21. This solid part 41 is connected to the bar 32 by a bar 42 and is also held by a bar 43, perpendicular to the bar 42. The solid parts 36, 38 and 41 are pressed respectively against the orifices 15, 20 and 23.

Screw-type needle valves 47 are screwed into the orifices 14 and 19.

FIG. 2 shows that the orifices 13, 14 and 15 communicate with one another via a chamber 44, whereas the orifices 17, 19 and 20 communicate with one another via a chamber 45.

The sealing joint is made of an elastomeric material ensuring a tight seal, whilst the base of the casing is preferably of metal but may also be of plastics.

When the actuating cylinder of the stopcock is to be supplied with compressed air, the orifice 12 is connected to a source of compressed air. The compressed air passes into the compartment 8 and then into the orifice 13 and emerges into the chamber 44. As the chamber 44 communicates with the orifice 14, the opening of which is reduced by the needle valve 47, and with the orifice 15, the opening of which is closed off by the solid part 36, which opens up the orifice 15 under the effect of pressure, the air preferably passes through the orifice 15 into the compartment 10, which is connected via a conduit 46 to the cylinder.

Conversely, when air is to pass from the conduit 46 to the outside, as the piston of the cylinder moves back, the air arriving in the compartment 10 cannot pass through the orifice 15 because the solid part 36 is now closing this orifice, but passes through the orifice 14, at a flow rate controlled by the needle valve 47, so that the rate of escape of the air can be regulated by tightening and slackening the needle valve 47.

What is claimed is:

1. One-piece sealing joint for sealing a casing shaped so as to define, at least partially, a mesh having a first side and defining a plane, comprising, projecting into the mesh, a solid part connected to the first side of the mesh by connecting means which enable the solid part to go out of the plane of the mesh, wherein said solid part is adjacent an orifice in said casing, and acts as a valve for said orifice by moving in and out of the plane of the mesh.

2. The Sealing joint according to claim 1, wherein the mesh has two sides adjacent to the first side comprising, as connecting means, a bar linking the solid part to first side of the mesh and another bar linking the solid part to the two sides of the mesh adjacent to the first side.

3. Sealing joint according to claim 2, wherein the two bars are perpendicular.

4. Sealing joint according to claim 1, which is in the form of a net having a plurality of meshes, at least two of which comprise a solid part.

5. A casing, comprising:
a base having an upper surface and an underside and formed with a hole there through from said upper surface to said underside, the underside of the base being subdivided into at least first, second and third compartments each of which is defined by a groove, the first compartment surrounding the hole and the second and third compartments each formed with two orifices passing into the base.

6. Casing according to claim 5, wherein the base further comprises fourth and fifth compartments, each of which has two orifices passing into the base, one of the orifices of the fourth compartment communicating with one of the orifices of the second compartment and one of the orifices of the fifth compartment communicating with one of the orifices of the third compartment via a second chamber.

7. Casing according to claim 6, wherein the one of the orifices of the fourth compartment communicates with the one of the orifices of the second compartment via a chamber formed in the upper surface of the base and extending over at least part of the two orifices.

8. Casing according to claim 7, wherein a sixth compartment is provided, having a through-orifice and an orifice opening into a conduit provided in the base and opening outside the casing.

9. Casing according to claim 8, wherein solid parts of the joint are in front of one of the orifices in the sixth compartment and in front of one of the orifices in the first and second compartments.

10. The Casing according to claim 7, wherein a flow regulating device is provided in the orifice in the fourth compartment to regulate the flow of air into the fourth compartment.

11. The Casing according to claim 7, wherein a flow regulating device is provided in one of the orifices in the fifth compartment to regulate the flow of air into the fifth compartment.

12. Casing according to claim 5, having grooves provided on the underside of the base, wherein the compartments are made leaktight relative to one another by a one-piece sealing joint shaped so as to define, at least partially, a mesh having a first side and defining a plane, the joint comprising a solid part projecting into the mesh, said solid part being connected to the first side by means which enable the solid part to go out of the plane of the mesh, the joint being accommodated in the grooves and wherein said solid part is adjacent one of the orifices of the fourth chamber in said casing, and acts as a valve for one of said orifices by moving in and out of the plane of the mesh.

13. A casing, comprising:
a base having an upper surface and an underside and formed with a hole there through from said upper surface to said underside, the underside of the base being subdivided into at least first, second, third, fourth and fifth compartments each of which is defined by a groove;
wherein the first compartment surrounds the hole;
wherein the second and third compartments are each formed with two orifices passing into the base;
wherein the fourth and fifth compartments each comprise two orifices passing into the base, wherein one of the orifices of the fourth compartment communicates with one of the orifices of the second compartment and one of the orifices of the fifth compartment communicates with one of the orifices of the third compartment via a second chamber;
wherein the one of the orifices of the fourth compartment communicates with the one of the orifices of the second compartment via a chamber formed in the upper surface of the base and extending over at least part of the two orifices; and
wherein a flow regulating device is provided in the orifice in the fourth compartment to regulate the flow of air into the fourth compartment.

14. The casing of claim 13, wherein a flow regulating device is provided in one of the orifices in the fifth compartment to regulate the flow of air into the fifth compartment.

15. A one-piece sealing joint for sealing a casing shaped so as to define, at least partially, a mesh having a first side and defining a plane, comprising:

a solid part projecting into the mesh and connected to the first side of the mesh by connecting means which enable the solid part to go out of the plane of the mesh, wherein said solid part is adjacent an orifice in said casing, and acts as a valve for said orifice by moving in and out of the plane of the mesh; and wherein the mesh has two sides adjacent to the first side comprising, as connecting means, a bar linking the solid part to the first side of the mesh and another bar linking the solid part to the two sides of the mesh adjacent to the first side.

16. The sealing joint according to claim 15, wherein the two bars are perpendicular.

* * * * *